United States Patent [19]
Dorsman

[11] Patent Number: 5,229,843
[45] Date of Patent: Jul. 20, 1993

[54] CIRCUIT FOR INCREASING THE RESOLUTION OF A LASER GYROSCOPE WITH CLOCK SYNCHRONIZATION

[75] Inventor: Adrian K. Dorsman, Sheldon, Iowa

[73] Assignee: Rockwell International Corporation, Seal Beach, Calif.

[21] Appl. No.: 768,270

[22] Filed: Aug. 22, 1985

[51] Int. Cl.$^5$ .............................. G01B 9/02; H04J 3/24
[52] U.S. Cl. ...................................... 356/350; 307/514
[58] Field of Search ........................ 356/350; 372/94; 307/514–516, 518

[56] References Cited

U.S. PATENT DOCUMENTS

| | | | |
|---|---|---|---|
| 3,627,425 | 12/1971 | Doyle et al. | 356/350 |
| 3,807,866 | 4/1974 | Zingery | 356/350 |
| 4,248,534 | 2/1981 | Elbert | 356/350 |
| 4,308,500 | 12/1981 | Avins | 307/514 X |
| 4,446,389 | 5/1984 | Williams et al. | 307/516 X |

*Primary Examiner*—Stephen C. Buczinski
*Attorney, Agent, or Firm*—H. Fredrick Hamann; George A. Montanye; Tom Streeter

[57] ABSTRACT

A laser gyroscope signal generator for increasing the resolution of the gyroscope, the signal generator being responsive to a sequence of pairs of phase shifted first and second laser gyroscope output pulses each being characterized to have a first and second laser gyroscope output pulses each being characterized to have a first and second logic state, said first and second output pulses in each pair having a leading or lagging phase relationship determined by the direction of rotation the laser gyroscope sourcing said pairs of phase shifted output pulses, the laser gyroscope output signal generator also being responsive to a system clock signal source for providing a clock signal having a pulse recurrent frequency greater than the pulse recurrent frequency of said phase shifted first and second laser gyroscope output pulses, the output signal generator comprising: a memory means responsive to said phase shifted first and second LGO (laser gyroscope output) pulses and said clock signal for transferring the logic state of each respective LGO pulse into a memory in synchronization with clock signal and for providing a clock cycle synchronized first and second LGO pulse and the complement of said second synchronized pulse LGO synchronized second LGO pulse; a first means responsive to said first and second clock synchronized LGO pulse for providing a first exclusive-OR signal characterized as the exclusive-OR of said first and second clock synchronized LGO impulse and for providing a complement second clock cycle delayed first exclusive-OR signal; and a second means responsive to said first synchronized LGO pulse and said clock signal for providing a second clock cycle signal delayed synchronized first LGO pulse.

5 Claims, 4 Drawing Sheets

CIRCUIT FOR INCREASING THE RESOLUTION OF A LASER GYROSCOPE WITH CLOCK SYNCHRONIZATION

BACKGROUND OF THE INVENTION

1. Field of the Invention

This invention relates to improvements in laser gyroscopes, and more particularly to circuits for increasing the resolution of a laser gyroscope.

2. Description of the Prior Art

Laser gyroscopes are known in the art to produce outputs comprised of optical pulses occurring at a rate dependent upon the rate of rotation of the laser gyroscope. Typically, two outputs are developed from a photodiode array which detects the optical frequency difference of clockwise and counterclockwise laser beams within the gyroscope. A laser gyro it typically equipped with a readout assembly having combining optics for extracting and combining a small percentage of light from each of the counter rotating beams and for focusing the combined light onto a photodiode array. A low noise amplifier amplifies the signals. The amplified signals are shaped to provide a two phase revolver type signal wherein one signal leads the other or lags the other by 90 degrees, depending upon the input axis rotation of the gyroscope. One circuit which has been advanced includes a pulse modification circuit for each output line including a preamplifier and squaring trigger together with logic circuitry to produce a first output representing clockwise pulses and a second output representing counterclockwise pulses. In the past, the output pulses produced tracked, one for one, the output pulses of the gyroscope; consequently, the resolution of the entire circuit has been limited by the pulse output frequency developed by the gyroscope.

A prior art circuit titled: "APPARATUS FOR INCREASING THE RESOLUTION OF A LASER GYROSCOPE", Ser. No. 457,845, filed Jan. 14, 1983 having a common inventor and assignee performs the required decoding and frequency multiplying of A quad B type signals as are typically output by a laser gyro. The circuit of this prior reference is self clocked by the input A quad B signals and provides clock and counter mode control signals to an up-down counter at purely random times with respect to the navigational system's system clock. Unsynchronized operation of this character may result in a readout from the counter that occurs at the same time that a clock pulse is being counted. Indeterminate states may result. In addition, the one-shots integrated circuits used in the prior art circuit are subject to noise pulses accompanying the input signal.

This invention circuit provides a synchronous A quad B decoding and enhancement circuit that does not require one-shots in its mechanization.

SUMMARY OF THE INVENTION

It is the object of this invention to provide a circuit for generating output pulses which are multiplied in number from the pulses developed by the laser gyro optical sensor. It is another object of the invention to provide an output circuit which provides output pulses having a higher pulse return frequency than the pulse frequency of the laser gyroscope optical sensor output. It is another object of the invention to provide a mode control logic signal to a counter to direct the counter to count up in response to signals from the laser gyroscope optical sensor as the gyro body is rotated in a first direction and to provide an alternate mode control signal to cause the counter to count in the opposite direction in response to signals from the optical sensor as the laser gyro is rotated in an opposite direction.

The invention, in its broad aspect, presents a laser gyroscope output signal generator that provides increased gyroscope resolution with substantial immunity to signal noise.

DESCRIPTION OF THE PREFERRED EMBODIMENT

Figure 1:
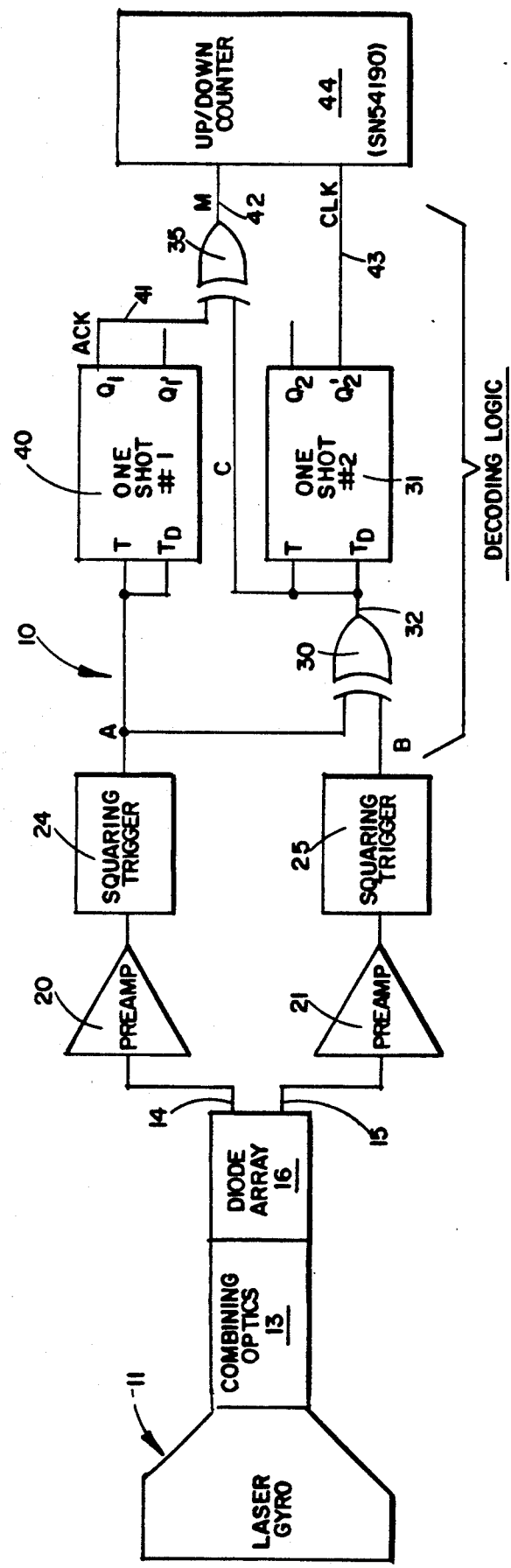
FIG. 1 is a PRIOR ART circuit schematic.

FIG. 1 shows a PRIOR ART laser gyroscope output signal generator titled "APPARATUS FOR INCREASING THE RESOLUTION OF A LASER GYROSCOPE", Ser. No. 457,845, filed Jan. 14, 1983 having a common inventor and assignee.

Figure 2:
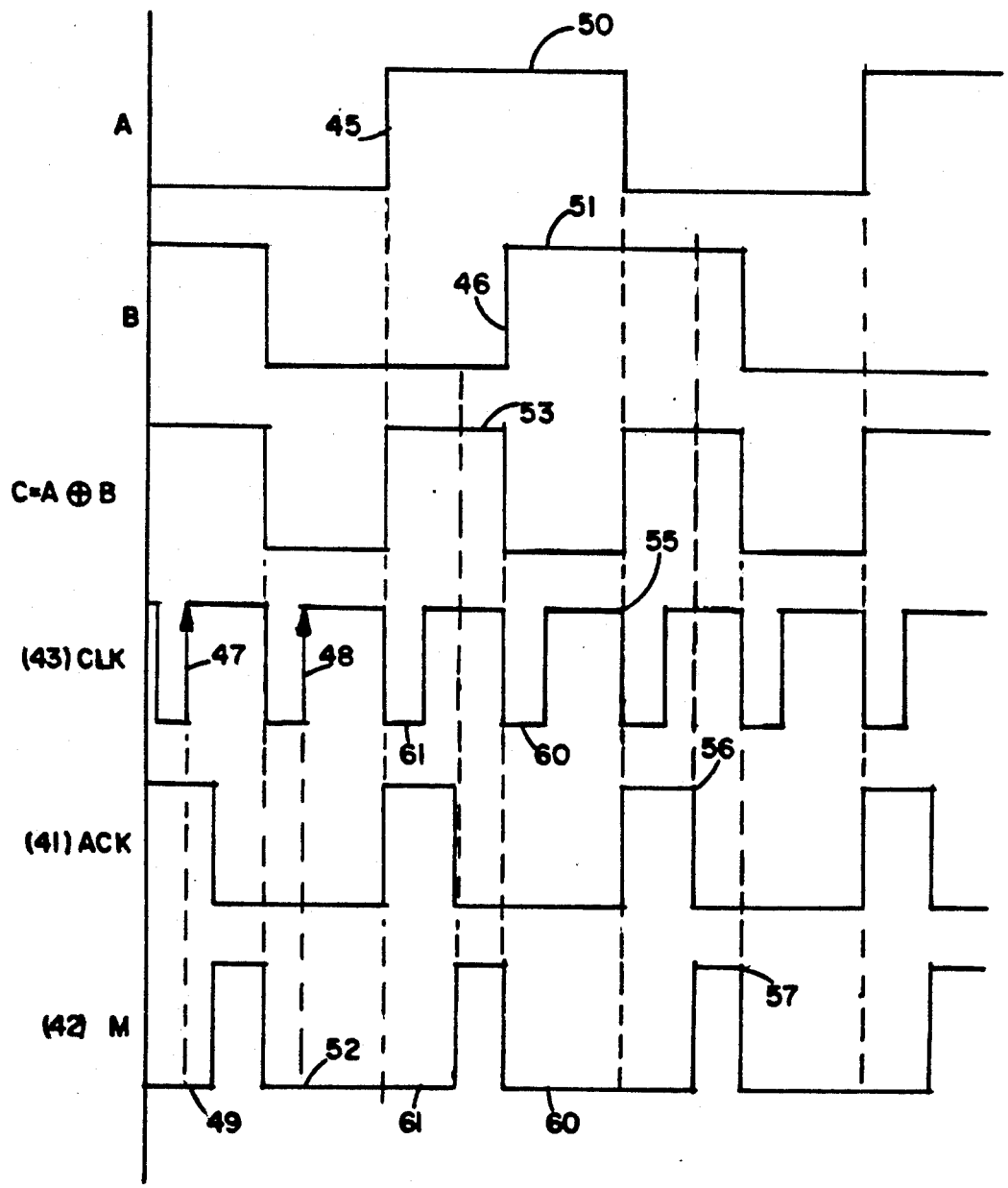
FIG. 2 is a timing diagram for the PRIOR ART circuit.

FIG. 2 illustrates the timing relationships between waveforms relating to the PRIOR ART circuit of FIG. 1.

Referring to FIG. 2, the A quad B waveforms 50, 51 are obtained from the laser gyro readout assembly of FIG. 1. Clockwise and counterclockwise laser beams within the gyroscope are combined by combining optics 13, and focused on a diode array for detection. Low level frequency difference signals are coupled via lines 14 and 15 to preamps 20 and 21, respectively for amplification. The outputs of preamps 20 and 21, respectively are coupled to squaring trigger circuits 24 and 25 to provide signals A and B on signal lines 26 and 28, respectively. FIG. 2 represents signals A and B by waveforms 50 and 51, respectively. Signal C is equal to the exclusive-OR of signals A and B and is represented by waveform 53. Observe that waveform 53 changes state four times during each cycle of signal A or signal B.

FIG. 2 shows the signal A leading edge 45 leading the signal B leading edge 46. This sequence is reversed as the direction of rotation of the laser gyroscope's input axis is reversed.

The signal CLK is present on signal line 43 of FIG. 1 and represents a clock signal for the up-down counter 44 of FIG. 1. ONE-SHOT #2, 31 is characterized to provide a clock signal for each logic state change at its T and TD inputs. The CLK signal is sensed at the Q2' output of ONE-SHOT #2 application to the clock signal input of up-down counter 44. The pulse recurrent frequency of the CLK signal is four times the frequency of signal A or signal B.

Referring again to FIG. 2, ONE-SHOT #1 provides signal Q1 on signal line 41 to an input of exclusive-OR gate 35 in response to each change of state of signal A at its T and TD inputs. Signal C is coupled via signal line 32 to a second input to exclusive-OR 35. The output of exclusive-OR 35 is signal M on signal line 42 to the mode signal input of up-down counter 44.

The predetermined interval of ONE-SHOT #1, 40 is represented by the positive interval of waveform 56. The predetermined delay interval of ONE-SHOT #2, 31 is represented by the negative intervals 61, 60 of waveform 55. For proper operation, the predetermined delay of ONE-SHOT #1, 40 must be longer than the predetermined delay time of ONE-SHOT #2, 31 as depicted in FIG. 2.

The up-down counter 44 is characterized to increment in a first direction each time signal CLK changes state from a low to a high logic level represented by transitions 47 and 48. Observe that the logic level of signal M is low at the moment 49, 52 of transitions 47, 48 to increment the up-down counter in a first direction. Reversing the direction of rotation to the input axis of the laser gyro reverses the phase relationship to waveforms 50 and 51. Signal M can be shown to be positive at transitions 47 and 48 of the CLK signal in response to a reversal of the phasing relationship between waveforms 50 and 51. Up/down counter 44 counts in a reverse direction for each transition 47, 48 of the CLK signal with mode signal M in a positive state of the instant of transition from a low to a high of the CLK signal.

Each increment of the up-down counter 44 is concurrent with the negative to positive transition of the CLK signal which varies in real time as a function of the body rate input to the laser gyroscope and is in no way synchronized with the master clock signal of the guidance system sensing the output of the counter. The PRIOR ART circuit of FIG. 1 provides no assurance that the up-down counter 44 will not be changing state at the instant counter 44 is sampled by the system for its content.

Figure 3:
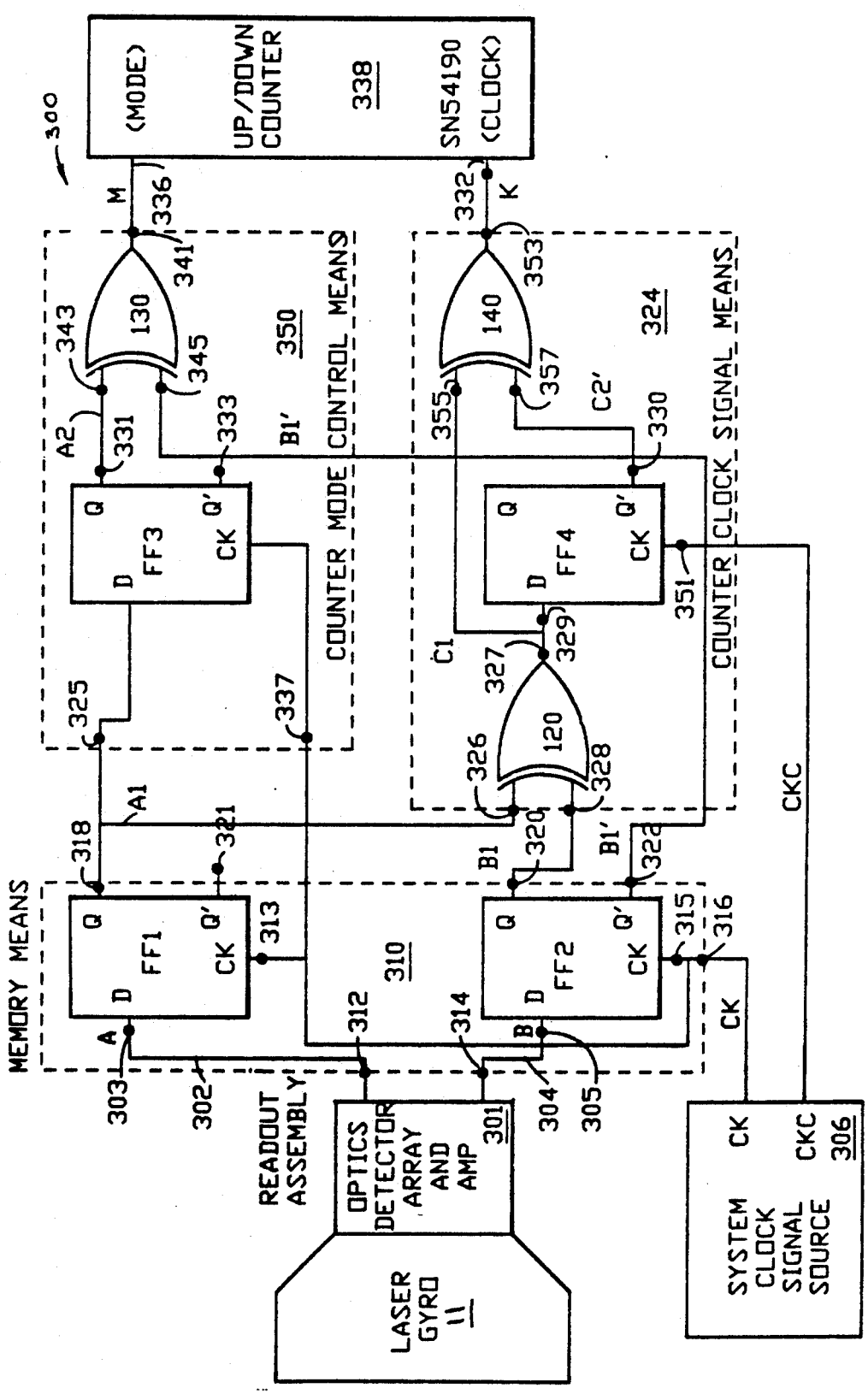
FIG. 3 is a schematic of the invention circuit.
Figure 4:
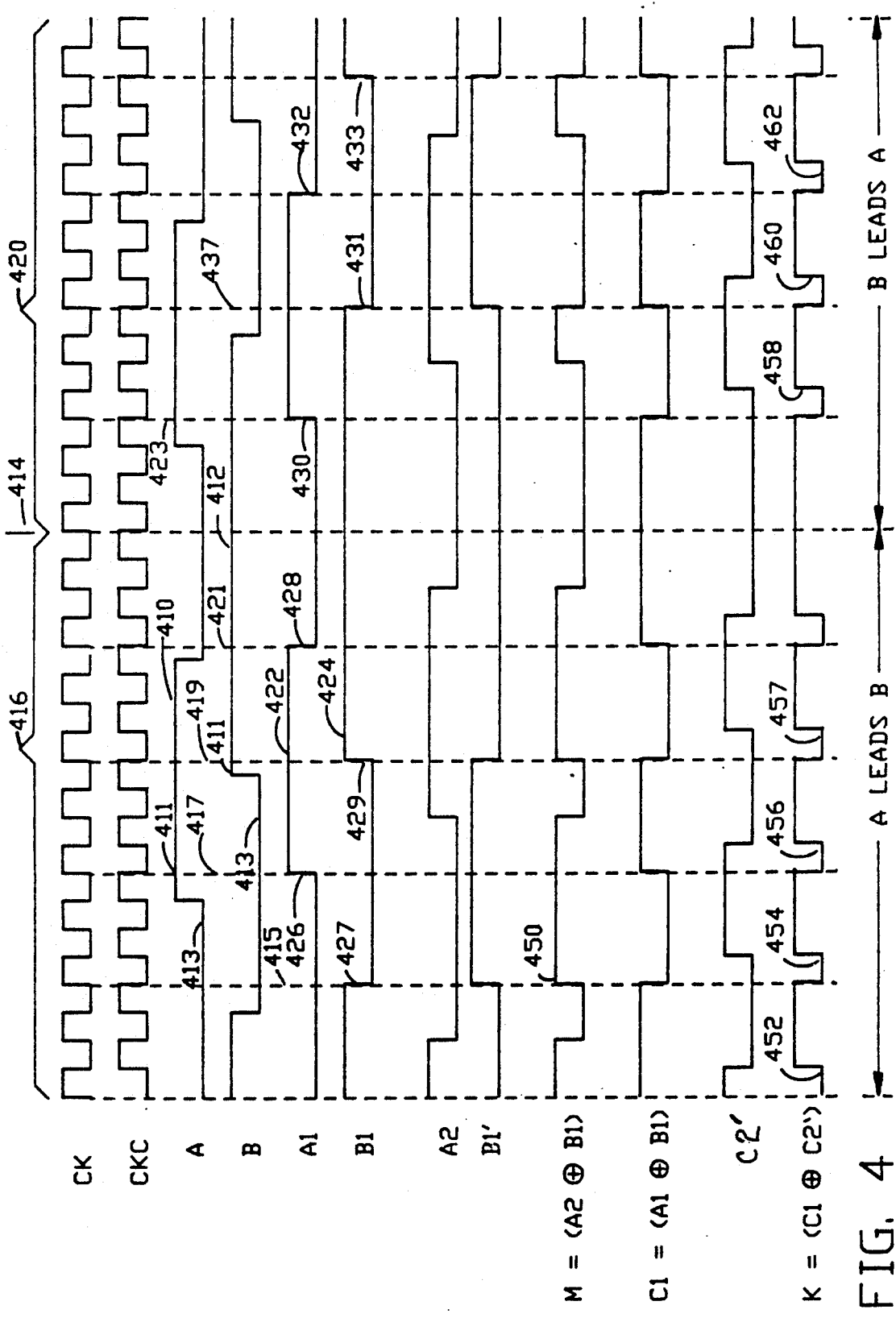
FIG. 4 is a timing diagram for the invention circuit.

Referring now to FIG. 3, the schematic of the invention circuit, A quad B signals A and B are coupled from the readout assembly 301 on signal lines 302, 304 to the D inputs of FLIP-FLOPs FF1 and FF2 303, 305, respectively. Signals A and B are represented in FIG. 4 as waveforms 410 and 412, respectively.

Signals A and B occur in pairs and correspond to a sequence of pairs of phase shifted first and second laser gyroscope output pulses. Each pair of output pulses is characterized as having a first and second logic state, such as the high and low states shown in FIG. 4 as 411 and 413 of waveform 410 and 412. FIG. 4 characterizes the concept of "phase-shifted first and second laser gyroscope output pulses" with waveforms 410 and 412 depicted in an interval on the right side of the Figure during which waveform B leads waveform A and an interval on the left side of FIG. 4 during which waveform A leads waveform B. The reference timing line 414 separates the two intervals.

The invention laser gyroscope output signal generator 300 is responsive to a system clock signal having a PRF (pulse recurrent frequency) greater than four times the PRF of the phase shifted first and second laser gyroscope output pulses. FIG. 3 shows the system clock signal source 306 providing clock signal CK and its complement clock signal CKC. The first and second waveforms at the top of FIG. 4 represent clock signals CK and CKC, respectively. Clock signal CK is coupled to the clock signal inputs of FLIP-FLOPs FF1, FF2 and FF3. Clock signal CKC is coupled to the clock signal input of FF4. All FLIP-FLOPs are D-FLIP-FLOPS such as the SN 5474 dual D-type positive-edge-trigger FLIP-FLOP by Texas Instruments. The SN 5474 reads the state of the signal at its D input as the clock signal applied to its CK input rises from a low to a high state. The D-FLIP-FLOP transfers this logic state to its Q output as the clock signal falls from a high state to a low state.

In a first embodiment of the signal generator, the circuit within phantom block 310 represents a memory means responsive to the phase shifted first and second laser gyroscope output pulses, A and B at its inputs 312 and 314. The memory means is also responsive to a clock signal such as the CK signal at input 316 for synchronously transferring the logic state of each respective laser gyroscope output pulse, such as A and B, into a memory, such as FF1 and FF2, in synchronization with a clock signal CK and for providing a clock synchronized first and second laser gyroscope output pulse, such as signals A1 and B1, and for providing the complement of the clock synchronized second laser gyroscope output pulse, such as signal B1'. Signal A1 is provided at the Q output 318 of FF1 and signal B1 is provided at the Q' output 320 of FF2. The B1' signal output is provided at the Q' output 322 of FF2.

Referring to FIG. 3, phantom block 324 represents a counter clock signal means responsive to the first and second clock synchronized laser gyro output pulse at inputs 326, 328 for providing a first exclusive-OR signal, such as signal C1, characterized as the exclusive-OR of the first and second clock synchronized laser gyro output pulses from the Q outputs of FF1 and FF2. The first means 324 also provides a synchronized delayed complement first exclusive-OR signal, such as signal C2' from the Q' output 330 of FF4. This signal is signal C1 delayed and complemented for one half clock cycle as it is read and stored by FF4 in response to the complement clock signal input to terminal 351.

The circuit of phantom block 350 represents a counter mode control means for providing a counter mode control signal M having a synchronized first logic state, such as a high state, for pairs of gyroscope output pulses A and B having a leading phase relationship and a synchronized second logic state, such as a low state, for pairs of gyroscope output pulses A and B having a lagging phase relationship. The circuitry within phantom block 324 represents a counter clock signal means for providing a counter clock signal K concurrent with the counter mode control signal M to the counter clock signal input 332.

In the embodiment of FIG. 3, the memory means 310 synchronously transfers the logic state of each respective laser gyro output pulse A and B into a memory, such as FF1 and FF2. The transfer is in synchronization with the clock signal to provide the clock synchronized first and second output pulse, A1 and B1, and the complement of said synchronized second laser gyro output pulse B1. FIG. 4 shows the timing relationship between signals A1 and B1 with respect to signals A and B with waveforms 410, 412 representing A and B and waveforms 422 and 424 representing A1 and B1. Reference timing line 419 assists in visualizing the synchronized character of waveform B1 in relation to clock signal CK.

The counter mode control means 350 is responsive to the synchronized first output pulse A1, and the complement second synchronized output pulse B1' and the clock signal CK for providing the counter mode control signal.

The counter clock signal means 324 is responsive to the synchronized first and second output pulse A1 and B1 for forming a synchronized exclusive-OR signal C1 characterized as the exclusive-OR of the synchronized first and second output pulses and for forming a delayed complement exclusive-OR signal C2'. The counter clock signal is formed as the exclusive-OR of the exclusive-OR signal C1 and the synchronized delayed complement exclusive-OR signal C2'.

The memory means 310 first and second D-type FLIP-FLOP FF1 and FF2 each have a logic signal input terminal, 303, 304, an output signal terminal, 318, 320, a complement output signal terminal 321, 322 and a clock signal input terminal 313, 315. The logic signal input terminals 303 and 304 are coupled to receive respective first and second gyro output pulses A and B. The clock signal CK is coupled to each respective clock signal input 313, 315. The first and second D-type FLIP-FLOP output terminals 318, 320 provide respective first and second synchronized output pulses A1 and B1.

Counter mode control means 350 comprises a third D-type FLIP-FLOP FF3, having a logic signal input terminal 325, an output signal terminal 331, a complement output signal terminal 333 and a clock signal input terminal 337. A first exclusive-OR gate 130 has an output terminal 341 and a first and second input terminal 343, 345. The third FLOP-FLOP logic signal input 325 is coupled to the first FLIP-FLOP output signal terminal 318. The clock signal CK is coupled to the clock signal input terminal 337.

The first exclusive-OR gate 130 second input terminal 345 is coupled to the second FLIP-FLOP complement output signal terminal 322. In the operation, the counter mode control signal M is provided at said first exclusive-OR gate output terminal 341.

The counter clock signal means 324 comprises a fourth D-type FLIP-FLOP FF4. This D-type FLIP-FLOP has a logic signal input terminal 329, an output signal terminal, a complement output signal terminal 330, a clock signal input terminal 351, and second and third exclusive-OR gates 120, 140. Each exclusive-OR gate has an output terminal 327, 353 and a first and second input terminal. The second exclusive-OR gate has first and second inputs 326, 328 and the third exclusive-OR gate has first and second inputs 355, 357.

The fourth FLIP-FLOP input signal terminal 329 is coupled to the second exclusive-OR output signal terminal 327 and to the third exclusive-OR first input terminal 355. The fourth FLIP-FLOP complement output signal terminal 330 is coupled to the third exclusive-OR second input terminal 357. The second exclusive-OR gate second input terminal 328 is coupled to the second FLIP-FLOP output signal terminal 320. The third exclusive-OR output signal terminal 353 is coupled to the counter signal input terminal 332 and provides counter clock signal K to this counter input.

In operation, the counter counts in a first sense, i.e. in increasing values, in response to the clock signal with the mode control signal being in a first logic state, i.e. a high state, and the counter counts in a second sense, i.e. in decreasing values, in response to the clock signal with the mode control signal in a second logic state, i.e. in a low state.

A more particular alternative embodiment is characterized as having FF1 through FF4, respectively. The circuit also has a first, second, and third exclusive-OR gate 20, 30, 40. Each exclusive-OR gate has an output terminal and a first and second input terminal. The logic signal input terminal to the first and second D-type FLIP-FLOPS is coupled to receive respective first and second gyro output pulses, i.e. the input of FF1 303 is coupled to 312 and the input to FF2, 304 is coupled to 314.

The third FLIP-FLOP logic signal input 325 is coupled to the second FLIP-FLOP output signal terminal 318 and to the first exclusive-OR gate first input terminal 326.

The second exclusive-OR gate second input terminal 328 is coupled to the second FLIP-FLOP output signal terminal 320.

The fourth FLIP-FLOP input signal terminal 329 is coupled to the second exclusive-OR output signal terminal 327 and to the third exclusive-OR first input terminal 355.

The fourth FLIP-FLOP complement output signal terminal 330 is coupled to the third exclusive-OR second input terminal 357.

The first exclusive-OR first input terminal 343 is coupled to the third FLIP-FLOP output signal terminal 331. The first exclusive-OR second input terminal 345 is coupled to the second FLIP-FLOP complement output signal terminal 322. The first exclusive-OR output signal terminal 341 is coupled to the counter mode control input 336 and the third exclusive-OR output signal terminal 353 is coupled to the counter clock signal input terminal 332.

Counter 338 counts in a first sense in response to the clock signal with the mode control signal being in a first logic state. The counter counts in a second sense in response to the clock signal with the mode control is in a second logic state.

The circuit decoding logic described, in accordance with the invention, provides increased resolution for the output of a laser gyroscope, and, at the same time, presents a concurrent mode signal indicating the sense or direction of rotation of the laser gyroscope with which it is associated.

Circuit Description

Referring to FIG. 3, operation of the invention circuit is explained with the aid of the timing chart of FIG. 4. The input A quad B signal is received from the optics detector array and amp block at nodes 312 and 314. These signal are characterized by waveforms titled A and B in FIG. 4. Waveform A, 410 leads waveform B 412 in time over the interval identified by [416]. Waveform A lags waveform B over the interval indicated by [420]. The two intervals 416 and 420 are divided by reference timing line 414.

Signals A and B are synchronized with the master clock from the system clock signal source 306 as signal CK and the complement clock signal as CKC. The top waveform in FIG. 4 represents the clock signal CK and the second waveform in FIG. 4 represents the complement clock signal CKC. These signals are typically derived from the master clock signal (not shown). Signals A and B vary in frequency as a function of body rate inputs to the gyro. Signals A1 and B1 are versions of signals A and B synchronized with the master clock by operation of D FLIP-FLOPS FF1 and FF2 which transfer the respective states of signals A and B to the respective FLIP-FLOP outputs on the rising edge of master clock signal CK. The synchronization of waveform A, shown as waveform A1, rises from a low to a high state at reference timing line 417. Clock signal CK is also seen rising from a low to a high state at this time.

Waveform B is synchronized with clock signal CK as waveform B1 changes from a high to a low state at 427 coincident with reference timing line 415 marking the change of clock signal CK from a low to a high state. Additional examples of synchronization of waveform A with clock signal CK as waveform A1 are indicated at references 428, 430 coincident with reference timing lines 421, 423, respectively. Additional examples of waveform B being synchronized with the block signal CK as waveform B1 are provided at 429, 431 coincident with reference timing lines 419 and 437, respectively. Waveforms A1 and B1 are therefore the logical equivalents of waveforms A and B but waveforms A1 and B1 are synchronized with the rising edge of master clock CK.

The exclusive-OR gates in FIG. 3 provide a high state output if either input is high but not if both inputs are high. The output assumes a low state of both inputs are low and if both inputs are high. The D FLIP-FLOPS are typically edge-triggered integrated circuits such as the 74LS 175 by Signetics of Sunnyvale, Calif. The state of the output Q assumes the logic state that the input D had one setup time before the LOW-to-HIGH clock transition. The state at the D input is transferred to the corresponding FLIP-FLOP's Q output. The setup time required for a D FLIP-FLOP is typically in excess of 20 ns.

The third FLIP-FLOP FF3 copies the state of the signal A1 to its Q output one clock cycle after the transfer of signal A to the first FLIP-FLOP's output Q. The signal at the Q output of the third FLIP-FLOP FF3 is designated as signal A2 and represents the past state of the signal A1. It can be shown that the EXCLUSIVE-OR of the past state of A1, i.e. the A2 signal, and the present state of B1' indicates the phase relation of the A1 versus B1 signals. Thus, a mode signal for an up-down counter such as the SN54169 may be expressed as:

$$M = (A2 \oplus B1')$$

An SN54169 counts up when M is true at the rising edge of the clock signal and counts down for the inverse condition. Logic states for signal M for both a leading waveform and for a lagging waveform are illustrated in FIG. 4 by signal M, waveform 450. Observe that signal M is in a high state for each clock signal K transition from a low to a high during the interval 416 that A leads B. Observe that the logic signal M is low for each clock signal K transition 458, 460, 462 from a low state to a high state during interval 420 when B leads A.

Exclusive-OR gate 120 forms the exclusive-OR of signals A1 and B1 as output signal C1. Output signal C1 changes state every time either A1 or B1 changes state. The transfer of the logic state of signal C1 at terminal 327 occurs on the rising edge of the complement clock signal CKC to the output of FF4. The low to high transition of the complement clock signal CKC occurs one-half clock cycle subsequent to each LOW-to-HIGH transition of clock signal CK. Use of the complement clock signal by FF4 shifts the logic state of signal C1 to the Q output of FF4 one-half of a clock period after each logic state change of signal C1. The exclusive-OR of signal C1 with the complement of the half-clock cycle delayed state of C1 generates a clock pulse K for each and every state transition of A1 or B1 as shown by signal K at the bottom of FIG. 4. Up-down counters such as the SN54169 count on the rising edge of the clock signal. It can be seen on FIG. 4 that while A1 leads B1 during the interval 416, the mode signal M is in a high state at the positive transition of K. Therefore, the counter 338 will count up, and conversely the mode signal is in a low state when signal B1 leads signal A as during interval 420. The counter 338 counts down during this interval. It is understood that up-down counters such as the 54,190 and the 54,169 can be ganged to form counter registers having a larger capacity than is available using a single counter device.

Because a clock pulse is generated at each transition of signals A1 and B1, the output clock frequency is four times the frequency of signals A1 or B1. This resolution enhancement makes this a desirable circuit for use with a laser gyroscope or any other device which generates an A quad B type signal such as the signals A and B.

The clock signal CK as applied to FF1 and FF2, samples the synchronized signals A and B at its rising edge only. Thus, this circuit is singularly insensitive to noise pulses which may be superimposed on signals A and B. State changes of signals A and B are not transferred to the outputs of FF1 and FF2 unless a minimum set-up time is satisfied. Therefore, narrow noise pulses synchronous with the CK edge will not be transferred to the Q outputs of FF1 and FF2. The circuit of FIG. 4 has been used in a three-channel universal up-down counter for laser gyroscope tests and evaluation.

Although the invention has been described and illustrated with a certain degree of particularity, the present disclosure has been made by way of example only and numerous changes in the combination and arrangement of parts may be resorted to by those skilled in the art without departing from the spirit and scope of the invention as hereinafter claimed.

What is claimed is:

1. A laser gyroscope output signal generator for increasing the resolution of the gyroscope by providing a multiplied clock signal and a mode control signal to increment a counter, said counter having a COUNTER MODE CONTROL SIGNAL INPUT and a COUNTER CLOCK SIGNAL INPUT, the counter providing a count related to gyro body rotation, the signal generator being responsive to a sequence of pairs of phase shifted first and second laser gyroscope output pulses, each pair of output pulses being characterized to have a first and second logic state, said first and second output pulses in each pair having a leading or lagging phase relationship determined by the direction of rotation of the laser gyroscope sourcing said pairs of phase shifted output pulses, the laser gyroscope output signal generator also being responsive to a system clock signal source providing a clock signal and a complement clock signal having a pulse recurrent frequency greater than the pulse recurrent frequency of said phase shifted first and second laser gyroscope output pulses, the output signal generator comprising:

a memory means responsive to said phase shifted first and second laser gyroscope output pulses and said clock signal providing a first and second D-type FLIP-FLOP, each D-type FLIP-FLOP having a logic signal input terminal, an output signal terminal, a complement output signal terminal and a clock signal input terminal;

the logic signal input terminal to said first and second D-type FLIP-FLOPS being coupled to receive respective first and second gyro output pulses:

said clock signal being coupled to each respective clock signal input, said first and second D-type FLIP-FLOP output terminals providing respective synchronized, first and second output pulses and said second D-type FLIP-FLOP complement output signal terminal providing a complement synchronized second output pulse; whereby, the change of state of said phase shifted first and second laser gyro output pulses are delayed by one clock cycle to form said respective synchronized first and second output pulses in synchronization with the change of state of said clock signal.

a counter mode control means responsive to said synchronized first output pulse, to said synchronized complement second output pulse and to said clock signal for providing a clock signal synchronized counter mode control signal to said COUNTER MODE CONTROL SIGNAL INPUT, said counter mode control signal having a synchronized first logic state for pairs of gyroscope output pulses having a leading phase relationship and a synchronized second logic state for pairs of gyroscope output pulses having a lagging phase relationship; and a counter clock signal means responsive to said synchronized first and second output pulses and to said clock signal for forming a synchronized exclusive-OR signal characterized as the exclusive-OR of said synchronized first and second output pulses and for forming a delayed complement exclusive-OR signal;

said counter clock signal being formed as the exclusive-OR of said synchronized exclusive-OR signal and synchronized delayed complement exclusive-OR signal.

2. The signal generator of claim 1 wherein said counter mode control means further comprises:

a third D-type FLIP-FLOP, having a logic signal input terminal, an output signal terminal, a complement output signal terminal and a clock signal input terminal; and a first exclusive-OR gate having an output terminal and a first and second input terminal;

said third FLIP-FLOP logic signal input being coupled to said first FLIP-FLOP output signal terminal; and said clock signal being coupled to said third FLIP-FLOP clock signal input terminal;

said third FLIP-FLOP being characterized to copy said synchronized first output pulse to said third FLIP-FLOP output signal terminal one clock cycle after the transfer of the change of state of said synchronized first output pulse at said first FLIP-FLOP output terminal to form a signal representing the past state of said synchronized first output pulse, at said third FLIP-FLOP output signal terminal;

said first exclusive-OR gate second input terminal being coupled to said second FLIP-FLOP complement output signal terminal;

whereby, said counter mode control signal is provided at said first exclusive-OR gate output terminal as the exclusive-OR of said complement synchronized second output pulse and said delayed clock synchronized first output pulse.

3. The signal generator of claim 2 wherein said counter clock signal means further comprises:

a fourth D-type FLIP-FLOP having a logic signal input terminal, an output signal terminal, a complement output signal terminal and a clock signal input terminal; and a second and third exclusive-OR gate, each exclusive-OR gate having an output terminal and a first and second input terminal;

said fourth FLIP-FLOP input signal terminal being coupled to said second exclusive-OR output signal terminal and to said third exclusive-OR first input terminal;

said fourth FLIP-FLOP complement output signal terminal being coupled to said third exclusive-OR second input terminal;

said second exclusive-OR gate first input terminal being coupled to said first FLIP-FLOP output signal terminal;

said second exclusive-OR gate second input terminal being coupled to said second FLIP-FLOP output signal terminal; and said third exclusive-OR output signal terminal being coupled to said counter clock signal input terminal;

whereby, said counter counts in a first sense in response to said clock signal with said mode control signal being in a first logic state and said counter counts in a second sense in response to said clock signal with said mode control being in a second logic state.

4. A laser gyroscope output signal generator for increasing the resolution of the gyroscope by providing a multiplied clock signal and a mode control signal to increment a counter having a COUNTER MODE CONTROL SIGNAL INPUT and a COUNTER CLOCK SIGNAL INPUT, the counter providing a count related to gyro body rotation, the signal generator being responsive to a sequence of pairs of phase shifted first and second laser gyroscope output pulses, each pair of output pulses being characterized to have a first and second logic state, said first and second output pulses in each pair having a leading or lagging phase relationship determined by the direction of rotation of the laser gyroscope sourcing said pairs of phase shifted output pulses, the laser gyroscope output signal generator also being responsive to a system clock signal source providing a clock signal (CK) and a complement clock signal (CKC) having a pulse recurrent frequency greater than the pulse recurrent frequency of said phase shifted first and second laser gyroscope output pulses, the output signal generator comprising:

a memory means responsive to said phase shifted first and second laser gyroscope output pulses and said clock signal having a first and second D-type FLIP-FLOP, each D-type FLIP-FLOP having a logic signal input terminal, an output signal terminal, a complement output signal terminal and a clock signal input terminal;

the logic signal input terminal to said first and second D-type FLIP-FLOPS being coupled to receive respective first and second gyro output pulses;

said clock signal being coupled to each respective clock signal input, said first and second D-type FLIP-FLOP output terminals providing respective synchronized, first and second output pulses and said second D-type FLIP-FLOP complement output signal terminal providing a complement synchronized second output pulse; whereby, the change of state of said phase shifted first and second laser gyro output pulses are delayed by one clock cycle to form said respective synchronized first and second output pulses in synchronization with the change of state of said clock signal; and a counter mode control means responsive to said synchronized first output pulse, to said complement second output pulse and to said clock signal for providing a clock signal synchronized counter mode control signal to said COUNTER MODE CONTROL SIGNAL INPUT, said counter mode control means being responsive to said synchronized first output pulse, and the complement second synchronized output pulse and the clock signal for providing a counter mode control signal having a clock signal synchronized first logic state for pairs of gyroscope output pulses having a leading phase relationship and a clock signal synchronized second logic state for pairs of gyroscope output pulses having a lagging phase relationship; and, a counter clock signal means responsive to said first and second synchronized output pulses and to said clock signal for forming a synchronized exclusive-OR signal characterized as the exclusive-OR of said first and second synchronized output pulses and for forming a delayed complement exclusive-OR signal, and for providing a counter clock signal formed as the exclusive-OR of said synchronized exclusive-OR signal and said delayed complement exclusive-OR signal to said counter clock signal input.

5. A laser gyroscope output signal generator for increasing the resolution of the gyroscope by providing a multiplied clock signal and a mode control signal to increment a counter, said counter having a COUNTER MODE CONTROL SIGNAL INPUT and a COUNTER CLOCK SIGNAL INPUT, the counter providing a count related to gyro body rotation, the signal generator being responsive to a sequence of pairs of phase shifted first and second laser gyroscope output pulses, each pair of output pulses being characterized to have a first and second logic state, said first and second output pulses in each pair having a leading or lagging phase relationship determined by the direction of rotation of the laser gyroscope sourcing said pairs of phase shifted output pulses, the laser gyroscope output signal generator also being responsive to a system clock signal source providing a clock signal and a complement clock signal having a pulse recurrent frequency greater than the pulse recurrent frequency of said phase shifted first and second laser gyroscope output pulses, the output signal generator comprising:

a first, second, third and fourth D-type FLIP-FLOP, each D-type FLIP-FLOP having a logic signal input terminal, an output signal terminal, a complement output signal terminal and a clock signal input terminal; and a first, second, and third exclusive-OR gate, each exclusive-OR gate having an output terminal and a first and second input terminal;

the logic signal input terminal to said first and second D-type FLIP-FLOPS being coupled to receive respective first and second gyro output pulses;

said third FLIP-FLOP logic signal input being coupled to said first FLIP-FLOP output signal terminal and to said first exclusive-OR gate first input terminal;

said first exclusive-OR gate second input terminal being coupled to said second FLIP-FLOP output signal terminal;

said fourth FLIP-FLOP input signal terminal being coupled to said first exclusive-OR output signal terminal and to said third exclusive-OR first input terminal;

said fourth FLIP-FLOP complement output signal terminal being coupled to said third exclusive-OR second input terminal;

said second exclusive-OR first input terminal being coupled to said third FLIP-FLOP output signal terminal and said second exclusive-OR second input terminal being coupled to said second FLIP-FLOP complement output signal terminal;

said second exclusive-OR output signal terminal being coupled to said counter mode control input and said third exclusive-OR output signal terminal being coupled to said counter clock signal input terminal;

whereby, said counter counts in a first sense in response to said clock signal with said mode control signal being in a first logic state and said counter counts in a second sense in response to said clock signal with said mode control being in a second logic state.

* * * * *